(12) United States Patent
Yoo et al.

(10) Patent No.: US 8,133,942 B2
(45) Date of Patent: Mar. 13, 2012

(54) THERMOPLASTIC RESIN COMPOSITION HAVING SUPERIOR FLAME RETARDANCY, COLORING PROPERTY AND SCRATCH-RESISTANCE

(75) Inventors: Je-sun Yoo, Gyeongsangbuk-do (KR); Ki-young Nam, Jeollanam-do (KR); Yong-yeon Hwang, Daejeon (KR); You-seok Seo, Jeollanam-do (KR); Hyeon-gook Kim, Seoul (KR); Myeong-soo Song, Jeollanam-do (KR)

(73) Assignee: LG Chem, Ltd. (KR)

( * ) Notice: Subject to any disclaimer, the term of this patent is extended or adjusted under 35 U.S.C. 154(b) by 223 days.

(21) Appl. No.: 12/561,353

(22) Filed: Sep. 17, 2009

(65) Prior Publication Data

US 2010/0069540 A1 Mar. 18, 2010

(30) Foreign Application Priority Data

Sep. 18, 2008 (KR) .................. 10-2008-0091500

(51) Int. Cl.
*C08K 5/02* (2006.01)
(52) U.S. Cl. .......... 524/81; 524/101; 525/240; 525/241; 525/315; 525/316; 525/281; 525/282
(58) Field of Classification Search .......... 524/81, 524/101; 525/240, 241, 315, 316, 281, 282
See application file for complete search history.

(56) References Cited

U.S. PATENT DOCUMENTS

| | | | |
|---|---|---|---|
| 3,959,219 A | | 5/1976 | Aoyama et al. |
| 4,912,162 A | * | 3/1990 | Kishida et al. .................. 525/67 |
| 4,977,262 A | * | 12/1990 | Herzlinger et al. ........... 544/221 |
| 5,180,787 A | | 1/1993 | Shorr et al. |

FOREIGN PATENT DOCUMENTS

| CN | 101002661 A | 7/2007 |
|---|---|---|
| CN | 101061177 A | 10/2007 |
| JP | 2008-519153 T | 6/2008 |
| KR | 19950010649 B1 | 2/1999 |
| KR | 10-20040071437 * | 8/2004 |
| KR | 100515590 A | 8/2004 |
| KR | 1020040071437 A | 8/2004 |
| WO | 02074853 A1 | 9/2002 |

OTHER PUBLICATIONS

"Synthesis and Use of Bromoaryl Containing Flame Retardant", 73 pages, dated Mar. 31, 2007 (English translation of abstract only).

* cited by examiner

*Primary Examiner* — Robert D. Harlan
(74) *Attorney, Agent, or Firm* — Lerner, David, Littenberg, Krumholz & Mentlik, LLP

(57) ABSTRACT

Provided is a thermoplastic resin composition having excellent flame resistance, colorability, and scratch resistance, including: A) 100 parts by weight of a basic resin comprising 10 to 89 wt % of acrylonitrile-butadiene-styrene copolymer, 89 to 10 wt % of styrene-acrylonitrile copolymer, and 1 to 40 wt % of methylmethacrylate polymer; B) 1 to 30 parts by weight of bromoalkyl or bromophenyl cyanurate compounds; and C) 1 to 20 parts by weight of antimony compound, thereby, making it possible to provide the thermoplastic resin composition having excellent flame resistance, impact strength, scratch resistance, colorability, and surface hardness as synergy effects.

8 Claims, No Drawings

THERMOPLASTIC RESIN COMPOSITION HAVING SUPERIOR FLAME RETARDANCY, COLORING PROPERTY AND SCRATCH-RESISTANCE

CROSS-REFERENCE TO RELATED APPLICATION

This application claims priority from Korean Patent Application No. 10-2008-0091500 filed on Sep. 18, 2008, in the Korean Intellectual Property Office, the disclosure of which is incorporated herein by reference in its entirety.

TECHNICAL FIELD

The present invention relates to a thermoplastic resin composition having excellent flame resistance, colorability, and scratch resistance, and more specifically, a thermoplastic resin composition having excellent flame resistance, impact strength, scratch resistance, colorability, and surface hardness as synergy effects by adding methylmethacrylate polymer, bromoalkyl or bromophenyl cyanurate compound, and antimony compound to resin including acrylonitrile-butadiene-styrene copolymer.

BACKGROUND OF THE INVENTION

Generally, acrylonitrile-butadiene-styrene resin (hereinafter, referred to as 'ABS resin') has been widely used as an exterior material for electric/electronic products, office appliances, etc., by having excellent stiffness and chemical resistance due to acrylonitrile component and excellent workability and mechanical strength due to styrene component. However, the ABS resin is easily combustible and therefore, has a problem of vulnerability to a fire.

Therefore, the ABS resin used for the electric/electronic products, the office appliances, etc., should have predetermined flame resistance (flame retardant standard) so as to ensure flame resistance.

Examples of a method for providing flame resistance to the ABS resin may include a method of adding and polymerizing flame resistance monomer when preparing rubber-modified styrene resin, a method of mixing flame retardant and auxiliary flame retardant with prepared rubber-modified styrene resin, etc.

The flame retardant may be largely classified into halogen-containing flame retardants and halogen-free flame retardants. Examples of the halogen-free flame retardant may include nitrogen-containing flame retardant and hydration containing flame retardant, etc.

The halogen-free flame retardant is much poorer in flame retardant efficiency than the halogen-containing flame retardant. Therefore, a relatively larger amount of halogen-free flame retardant is used, which degrades mechanical properties of the rubber modified styrene resin. Therefore, the most widely accepted method for providing the flame resistance to the ABS resin at the moment uses the halogen-containing flame retardant.

The halogen-containing flame retardants improve flame resistance while maintaining the mechanical properties of the rubber modified styrene resin. Among others, brominated flame retardant is particularly effective.

However, the currently available ABS resin with flame resistance has significantly poor scratch resistance due to properties of butadiene rubber, and therefore high gloss products are easily scratched. In fact, most flame-retardant ABS resins available today have very poor scratch resistance, i.e., pencil hardness of about 3B or 4B.

Therefore, a need exists for the development of an ABS resin having excellent flame resistance while maintaining excellent scratch resistance, impact strength, and fluidity.

SUMMARY OF THE INVENTION

The present invention proposes to solve the above problems. It is an aspect of the present invention to provide a thermoplastic resin composition having excellent flame resistance, impact strength, scratch resistance, colorability, and surface hardness by a synergistic combination of methylmethacrylate polymer, bromoalkyl or bromophenyl cyanurate compound, and antimony compound.

In accordance with another aspect of the present invention, a thermoplastic resin composition having excellent flame resistance, colorability, and scratch resistance, comprises: A) 100 parts by weight of a basic resin comprising 10 to 89 wt % of acrylonitrile-butadiene-styrene copolymer, 89 to 10 wt % of styrene-acrylonitrile copolymer, and 1 to 40 wt % of methylmethacrylate polymer, B) 1 to 30 parts by weight of bromoalkyl or bromophenyl cyanurate compounds, and C) 1 to 20 parts by weight of antimony compound.

DETAILED DESCRIPTION

Hereinafter, the present invention will be described in detail.

A thermoplastic resin composition having excellent flame resistance, colorability, and scratch resistance comprises: A) 100 parts by weight of a basic resin comprising 10 to 89 wt % of acrylonitrile-butadiene-styrene copolymer, 89 to 10 wt % of styrene-acrylonitrile copolymer, and 1 to 40 wt % of methylmethacrylate polymer, B) 1 to 30 parts by weight of bromoalkyl or bromophenyl cyanurate compounds, and C) 1 to 20 parts by weight of antimony compound.

The acrylonitrile-butadiene-styrene copolymer can be prepared in any manner known to one of ordinary skill in the art and is not particularly limited to a certain method. For example, the acrylonitrile-butadiene-styrene copolymer can be prepared in a powder state by performing emulsification and graft polymerization on butadiene rubber, acrylonitrile monomer, and styrene monomer and then coagulating, dehydrating, and drying it. Preferably, the acrylonitrile-butadiene-styrene copolymer is prepared in a powder state by continuously and collectively inputting a monomer mixture of 5 to 40 parts by weight of acrylonitrile monomer and 20 to 65 parts by weight of styrene monomer in a mixed solution comprising 30 to 70 parts by weight butadiene rubber having an average diameter of 0.1 to 0.5 μm for total 100 parts by weight of monomer and butadiene rubber, 0.6 to 2 parts by weight of emulsifier, 0.2 to 1 parts by weight of molecular weight regulator, and 0.05 to 0.5 parts by weight of polymerization initiator, performing emulsification and graft polymerization thereon, and then coagulating, dehydrating, and drying it with 5% sulfuric acid solution.

Preferably, the styrene-acrylonitrile copolymer has a weight average molecular weight of 50,000 to 150,000 and includes 20 to 40 wt % of acrylonitrile monomer. The acrylonitrile monomer can be used alone or a mixture two or more acrylonitrile monomers can be used alone.

The methylmethacrylate polymer can be prepared in any manner known to one of ordinary skill in the art and is not particularly limited to a certain method. Preferably, the methylmethacrylate polymer has a weight average molecular weight of 50,000 to 150,000. The combination of methylmethacrylate polymer and bromoalkyl or bromophenyl cyanurate compound that is an organic flame retardant in the thermoplastic resin composition of the present invention has a synergistic effect and remarkably improves scratch resistance.

Preferably, the methylmethacrylate polymer is included as 1 to 40 wt % with respect to the basic resin. When the amount of methylmethacrylate polymer is less than 1 wt %, there is a problem of the degradation of scratch resistance and when the amount of methylmethacrylate polymer is more than 40 wt %, there is a problem of the degradation of impact resistance.

The bromoalkyl or bromophenyl cyanurate compound, which is the brominated organic flame retardant, may be tris (tribromophenyl) cyanurate and is included in an amount of 1 to 30 parts by weight for 100 parts by weight of the basic resin. The thermoplastic resin composition prepared in this range has excellent thermal stability and weather resistance without degrading mechanical strength and fluidity.

For reference, the tris(tribromophenyl)cyanurate is a compound having a structure of the following Formula 1.

[Formula 1]

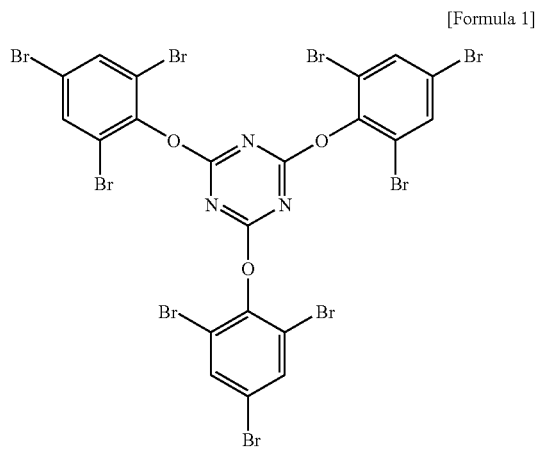

When the antimony compound, an auxiliary flame retardant is used together with the brominated organic flame retardant, it synergistically improves the flame resistance of the prepared thermoplastic resin composition.

Preferably, examples of the antimony compound may include antimony trioxide, antimony pentoxide, antimony metal, antimony trichloride, etc. More preferably, the antimony oxide is used.

Preferably, the antimony compound is included in an amount of 1 to 20 parts by weight with respect to 100 parts by weight of the basic resin. The thermoplastic resin composition prepared in this range has excellent flame resistance without degrading mechanical strength.

The thermoplastic resin composition may include one or more additives selected from a group consisting of impact reinforcement agent, lubricant, thermal stabilizer, anti-dripping agent, anti-oxidation agent, photostabilizer, UV screening agent, pigment, inorganic filler, etc.

Hereinafter, exemplary embodiments are described in order to help the understanding of the present invention. The following embodiments describe the present invention by way of example only. It is apparent to those skilled in the art that various changes and modifications can be made in the scope and spirit of the present invention. It is to be understood that the present invention is intended to cover these changes and modifications included in the appended claims.

Examples

Example 1

A thermoplastic resin composition was prepared in a pellet form by adding 20 parts by weight of tris (tribromophenyl) cyanurate that is brominated organic flame retardant, 3 parts by weight of antimony trioxide that is auxiliary flame retardant, 3 parts by weight of black colorant, 0.3 parts by weight of anti-oxidation agent, 1.5 parts by weight of lubricant, and 0.1 parts by weight of anti-dripping agent to 100 parts by weight of basic resin comprising 20 wt % of ABS copolymer (DP270 made by LG Chemical Co.) prepared by performing emulsification graft polymerization using butadiene rubber latex having an average diameter of 0.3 μm, 70 wt % of styrene-acrylonitrile copolymer whose acrylonitrile content is 25 wt % and weight average molecular weight is 120,000, and 10 wt % of methylmethacrylate polymer (EH910 made by LG MMA Co.) whose weight average molecular weight is about 130,000, evenly mixing them using a Hansel mixer, and then using a twin screw extruder. A sample for testing physical properties and flame retardant was prepared by performing injection molding on the thermoplastic resin composition in the pellet form.

Example 2

Example 2 was made by the same method as the above Example 1 except that in this example, 60 wt % of styrene-acrylonitrile copolymer and 20 wt % of methylmethacrylate polymer were used.

Comparative Example 1

Comparative Example 1 was made by the same method as the above Example 2 except that in this example, 23.5 parts by weight of tetrabromobisphenol A was used as brominated organic compound flame retardant so as to have the same bromine content.

Comparative Example 2

Comparative Example 2 was made using the same method as the above Example 2 except that in this example, 24 parts by weight of brominated epoxy oligomer in a non-cap form was used as brominated organic compound flame retardant so as to have the same bromine content.

Comparative Example 3

Comparative Example 3 was made by the same method as the above Example 2 except that in this example, 20 wt % of methylmethacrylate-styrene-acrylonitrile copolymer (made by LG Chemical Co.) was used instead of 20 wt % of methylmethacrylate polymer.

Comparative Example 4

Comparative Example 4 was made by the same method as the above Example 2 except that in this example, 20 wt % of methylmethacrylate polymer was not used.

Experimental Example

The characteristics/properties of the sample of the thermoplastic resin composition prepared in the above Examples 1 and 2 and the above Comparative Examples 1 to 4 were measured by the following method and the results were shown in the following Table 1.

Notched Izod Impact Strength was measured by ASTM D-256 using a ⅛ sample.

Pencil Hardness was measured by ASTM D-3365.

Colorability is represented by L, a, and b values obtained by measuring colorability of 3 parts by weight of colorant based on black using a SUGA color computer. Among these, the L value is a numerical value indicating brightness, wherein the lower the value of L, the brighter the color black.

Vertical Flammability was measured by UL-94.

TABLE 1

|  | Examples | | Comparative Examples | | | |
|---|---|---|---|---|---|---|
| Division | 1 | 2 | 1 | 2 | 3 | 4 |
| Impact Strength | 10.5 | 10.1 | 6.7 | 5.4 | 9.9 | 9.5 |
| Pencil Hardness | HB | HB~F | 2B | 2B | B | 2B |
| Colorability(L) | 22.78 | 22.68 | 23.41 | 23.12 | 23.15 | 22.91 |
| Flammability (1/12″) | V-0 | V-0 | V-0 | V-0 | V-2 | V-0 |

As shown in the above Table 1, it can be confirmed that the thermoplastic resin composition (Examples 1 and 2) of the present invention including methylmethacrylate polymer and tris(tribromophenyl)cyanurate as brominated organic flame retardant has excellent impact strength, pencil hardness (scratch resistance), colorability (L), and flammability. However, it can be confirmed that when the thermoplastic resin composition uses tetrabromobisphenol A or brominated epoxy oligomer instead of tris(tribromophenyl)cyanurate as brominated organic compound flame retardant (comparative examples 1 and 2), the impact strength, the pencil hardness, and the colorability were remarkably degraded and when the thermoplastic resin composition uses methylmethacrylate-styrene-acrylonitrile copolymer instead of methylmethacrylate polymer (comparative example 3), the pencil hardness and the colorability were degraded and in particular, the flammability was degraded. Also, it can be confirmed that when the thermoplastic resin composition does not include methylmethacrylate polymer (comparative example 4), the pencil hardness is remarkably degraded.

As described above, with the present invention, it provides a thermoplastic resin composition having excellent flame resistance, impact strength, scratch resistance, colorability useful to design a beautiful appearance, and surface hardness as synergy effects by adding methylmethacrylate polymer, bromoalkyl or bromophenyl cyanurate compounds, and antimony compound to resin including ABS resin.

While the present invention has been described with respect to the specific embodiments, it will be apparent to those skilled in the art that various changes and modifications may be made without departing from the spirit and scope of the invention as defined in the following claims.

What is claimed is:

1. A thermoplastic resin composition having excellent flame resistance, colorability, and scratch resistance, comprising:
    A) 100 parts by weight of a basic resin comprising 10 to 89 wt % of acrylonitrile-butadiene-styrene copolymer, 10 to 89 wt % of styrene-acrylonitrile copolymer, and 1 to 40 wt % of methylmethacrylate polymer having a weight average molecular weight of 50,000 to 150,000;
    B) 1 to 30 parts by weight of bromoalkyl or bromophenyl cyanurate compounds; and
    C) 1 to 20 parts by weight of an antimony compound.

2. The thermoplastic resin composition of claim 1, wherein the acrylonitrile-butadiene-styrene copolymer comprises 30 to 70 wt % of a butadiene rubber.

3. The thermoplastic resin composition of claim 1, wherein the styrene-acrylonitrile copolymer has a weight average molecular weight of 50,000 to 150,000.

4. The thermoplastic resin composition of claim 1, wherein the bromophenyl cyanurate compound is tris (tribromophenyl)cyanurate.

5. The thermoplastic resin composition of claim 1, wherein the antimony compound is one or more selected from a group consisting of antimony trioxide, antimony pentoxide, antimony metal, and antimony trichloride.

6. The thermoplastic resin composition of claim 1, further comprising one or more additives selected from a group consisting of an impact reinforcement agent, a lubricant, a thermal stabilizer, an anti-dripping agent, an anti-oxidizing agent, a photostabilizer, a UV screening agent, a pigment, and an inorganic filler.

7. The thermoplastic resin composition of claim 1, wherein the acrylonitrile-butadiene-styrene copolymer is prepared by emulsion graft polymerization.

8. The thermoplastic resin composition of claim 1, wherein the styrene-acrylonitrile copolymer comprises 20 to 40 wt % of an acrylonitrile monomer.

* * * * *